Aug. 23, 1960 — S. RUPPRIGHT — 2,949,931
MAGNETIC CHECK VALVE
Filed Jan. 29, 1958
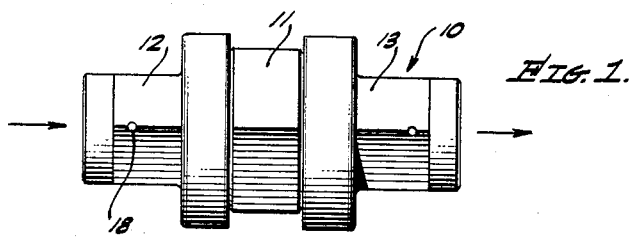
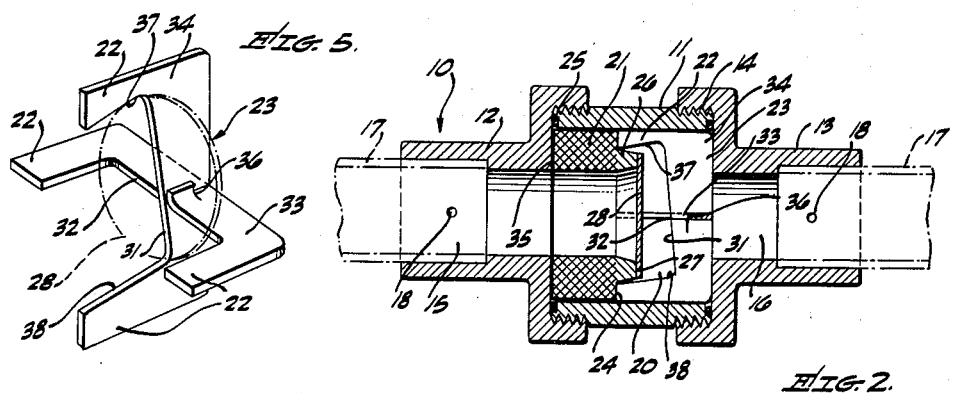
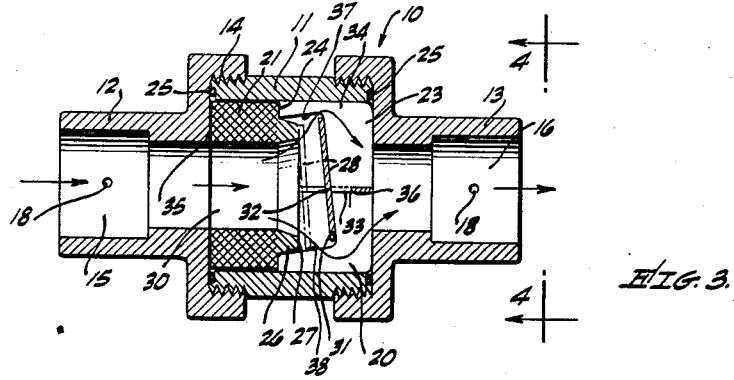
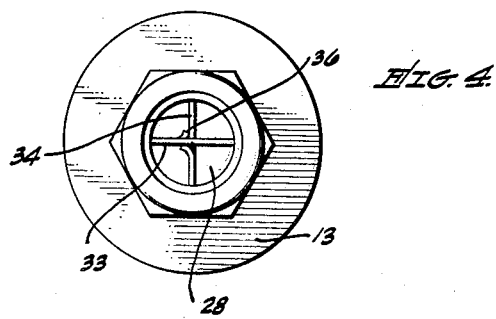
INVENTOR.
SIEGFRIED RUPPRIGHT,
BY
AGENT United States Patent Office 2,949,931
Patented Aug. 23, 1960

2,949,931

MAGNETIC CHECK VALVE

Siegfried Ruppright, Inglewood, Calif., assignor to Hughes Aircraft Company, Culver City, Calif., a corporation of Delaware Filed Jan. 29, 1958, Ser. No. 711,997

4 Claims. (Cl. 137—528)

The present application relates to improvements in magnetically operable one way check valves for use in controlling fluid flow.

In one way type check valves of the types which include magnets positioned within the fluid flow path, considerable difficulty has been experienced in providing a means for supporting the magnet, providing the desired magnetic gap between the magnet and an operating valve member, and eliminating the problems involved in connection with snap action closing and upstream fluid surging. Additionally, considerable obstruction to fluid flow and associated pressure drop across such valves has been experienced due to the presence of the operating magnet in the fluid flow path. To accomplish the correction of these problems, several prior attempts have met with considerable expense and have been impractical.

The improvement check valve of the present invention incorporates an annular tubular type magnetic member, together with an integral nonmagnetic valve seat, this improvement having been made possible through utilization of powdered permeable material held together with the nonpermeable binding material, the valve seat including only the nonpermeable binder. Also, line surging and audible valve closing action have been eliminated by a particular form of valve disc caging mechanism and the relationship thereof with regard to the valve seat forming an integral portion of the magnet.

It is accordingly one object of the present invention to provide an improved low cost mechanism in association with a magnetically operated fluid check valve.

It is another object of the invention to provide a one way fluid check valve having an improved magnetic member and improved operating characteristics as between such magnetic member and a valve disc.

It is a further important object of the invention to provide a one way fluid check valve having means for affecting cooperation between a permanent magnet and a valve disc, whereby to eliminate effects of line surging.

Other and further important objects of the invention will become apparent from the disclosure of the following detailed specification, appended claims and accompanying drawing, wherein:

Figure 1 is a side elevational view of the check valve of this invention;

Fig. 2 is an enlarged longitudinal sectional view of the valve showing components thereof in a closed position;

Fig. 3 is a sectional view similar to Fig. 2 showing components in an open position;

Fig. 4 is an end view of the valve as taken substantially as indicated by line 4—4, Fig. 3; and Fig. 5 is an enlarged perspective view of the valve disc caging structure as utilized herewith.

With reference to the drawing, the magnetically operable one way fluid check valve of this invention is shown as indicated generally at 10. The valve 10 includes a body structure which comprises a central elongated tubular member 11 with end fittings 12 and 13 secured thereto as by threads 14. The fittings 12 and 13 define inlet and outlet ports 15 and 16 respectively which may be secured to tubing 17 as shown with the dotted lines in Fig. 2. Openings 18 through walls of the fittings 12 and 13 serve to provide means for introducing solder or like substance whereby to secure the present valve to connecting tubing and in position in a fluid circuit. As shown, the body, including the members 11, 12 and 13, serves to define a chamber 20 in which operating components of the present valve arrangement are positioned.

As shown in Figs. 2 and 3, an annular, tubular permanent magnet 21 is positioned within the chamber 20 and retained therein by means of legs 22 integrally depended from a cross member cage indicated generally at 23. The legs 22 are adapted to engage an axially directed shoulder 24 on the magnet, with the magnet being retained in position within the chamber 20 by compression between inner surfaces of the fittings 12 and 13 acting through the cage legs 22. A pair of annular sealing members 25 are positioned in suitable grooves in ends of the body member 11, whereby to provide a seal between this body member 11 and the inner faces of the fittings 12 and 13.

The permanent magnet 21 is in the form of an annulus and is made from powdered or sintered permeable material such as iron, or of any of the various metallic compounds intended for magnetic purposes. The metallic particles forming the magnet 21 are held together by means of a binder which may be in the form of different types of plastic or other nonpermeable material such as metallic aluminum, brass or the like. In formation of the magnet 21, this magnet may be molded and an integral valve seat member 26 is formed thereon. The valve seat member 26 is of a diameter substantially less than an outer diameter of the permanent magnet 21 and presents an annular face 27 that is adapted for cooperation with an annular valve disc 28. In the process of molding the permanent magnet 21, the valve seat member 26 is formed integrally thereon and is preferably of a nonpermeable nature. Such an arrangement may be accomplished, for example, by first depositing in a mold the nonpermeable material or binder forming the valve seat member portion, and thereafter placing the powder impregnated binder in the mold and compressing the composite material into a unitary structure. Thus, an inexpensive magnetic gap is provided between the disc 28 and the permanent magnet 21. The necessity for such a gap is well known and serves to permit a more uniform rate of operation of the disc 28 during use of the present valve.

As shown in Fig. 2, it may thus be seen that the disc 28, which may be made from any suitable permeable material such as iron or the like, is attracted to and retained on the face 27 of the valve seat member 26 by action of the permanent magnet 21. The relationships of the components, as shown in Fig. 2, illustrates a static condition of the present check valve with reverse fluid flow by way of the outlet 16 being prevented. When fluid under pressure is introduced through the inlet 15, this fluid will pass through a central passage 30 in the magnet 21 and, when this pressure is sufficient to overcome the attractive force of the magnet 21, will cause movement of the valve disc 28 away from the face 27 of the valve seat 26. The disc 28 will thereafter rest against inner surfaces 31 and 32 of cross members 33 and 34, forming the cage 23. It is to be noted that the surface 31 is disposed at an angle to a plane extending through the face 27 of the valve seat member 26, it being understood that the face 32 may also be disposed at such an angle, as desired for particular installational situations. Thus, when fluid flow is experienced from the inlet to the outlet of the valve member, the valve disc 28 will assume the position shown in Fig. 3 against the surfaces 31 and 32 and fluid flow will occur about the disc and through the spaces between the portions 33 and 34 of the cage 23. When the pressure of the fluid being admitted through the inlet 15 drops to a level below that necessary to overcome the force of the permanent magnet 21, the disc 28 will again be attracted to the face 27 of the valve seat member 26 and, due to the angular disposition of the disc 28 when the valve is in an open position, the disc will engage the face 27 in the manner shown by the dotted lines in Fig. 3, and initially touching the face only in one radial area whereby to permit escape of a wedge-shaped mass of fluid that would otherwise be trapped between the face 27 and the contacting surface of the valve disc 28. This initial angular engagement between the disc 28 and the face 27 thus prevents line surging and closing of the valve in an audible manner.

As shown in Figs. 1, 2 and 3, the valve body and end fittings may be provided with suitable hexagonal outer surfaces to enable assembly thereof and suitable sealing material 35 may be disposed between one end of the magnet 21 and an inner surface of the fitting 12. Additionally, for assembly purposes, the cross members 33 and 34 of the cage 23 may be slotted as at 36 to maintain connection therebetween and are of a non-permeable resilient material requiring slight lateral bending during assembly to insure a rigid fit within the tubular body member 11. The cage 23 thus serves to guide and retain the disc 28 with the integral legs 22 thereof and serves also as a retention means for the magnet 21.

It may thus be seen that the check valve of this invention provides numerous improvements over similarly operable check valves known heretofore and that fluid flow restrictions and valve closing action are improved and, due to the particular construction of the magnetic member 21, the over-all cost of the valve may be reduced. The particular valve hereof therefore lends itself to miniaturization and use in fluid circuits requiring relatively small components.

It is also to be noted that the angular disposition of the valve disc relative to the axial flow path of the fluid passing through the valve serves to eliminate the normal fluid cone that is present in valve members positioned normal to the fluid flow path. Thus a reduction in fluid flow resistance is accomplished over that present in prior known valves of similar types. Additionally, inwardly directed edges 37 and 38 of the legs 22 depended from the cross member 34 may be angularly disposed whereby to cause lateral movement of the disc 28 when the valve is in an open position, to increase the distance between the periphery of the disc and the wall of the chamber 20 in an area of the disc that is furthermost from the magnetic member 21. Thus fluid flow will be directed in a non-turbulating manner through the valve.

Having thus described the invention and the present embodiment thereof, it is desired to emphasize the fact that many modifications may be resorted to in a manner limited only by a just interpretation of the following claims.

I claim:

1. A magnetically operable one way fluid check valve having a body, a chamber in said body, inlet and outlet ports communicating with said chamber, a valve disc of permeable material and a leg supported cross member cage for said disc and in said chamber, the combination with said valve of: an annular tubular permanent magnet, said magnet being compressed sintered material with a nonpermeable binding material therethrough and positioned within said chamber; means including clamping between said legs of said cage and one end of said body for retaining said magnet in said position within said chamber, and an annular nonpermeable valve seat formed integrally on said magnet from said binding material, said disc being adapted for fluid sealing cooperation with an annular face of said valve seat by attraction thereto and retention thereon by said magnet.

2. A magnetically operable one way fluid check valve having a body, a chamber in said body, inlet and outlet ports communicating with said chamber, a valve disc of permeable material and a leg supported cross member cage for said disc and in said chamber, the combination with said valve of: an annular tubular permanent magnet, said magnet being compressed sintered material with a nonpermeable binding material therethrough and positioned within said chamber; means including clamping between said legs of said cage and one end of said body for retaining said magnet in said position within said chamber; an annular nonpermeable valve seat formed integrally on said magnet from said binding material, said disc being adapted for fluid sealing cooperation with an annular face of said valve seat by attraction thereto and retention thereon by said magnet; and an angularly disposed surface on one cross member of said cage whereby to retain said disc in an angular disposition relative to and spaced from said valve seat upon fluid flow through said inlet and outlet ports and said chamber.

3. A magnetically operable one way fluid check valve having a body, a chamber in said body, inlet and outlet ports communicating with said chamber, a valve disc of permeable material and a leg supported cross member cage for said disc and in said chamber, the combination with said valve of: an annular tubular permanent magnet, said magnet being compressed sintered material with a nonpermeable binding material therethrough and positioned within said chamber; means including clamping between said legs of said cage and one end of said body for retaining said magnet in said position within said chamber; an annular nonpermeable valve seat formed integrally on said magnet from said binding material, said seat having a diameter spaced within said cage legs and less than a diameter of said magnet, said disc being adapted for fluid sealing cooperation with an annular face of said valve seat by attraction thereto and retention thereon by said magnet; and an angularly disposed surface on one cross member of said cage whereby to retain said disc in an angular disposition relative to and spaced from said valve seat upon fluid flow through said inlet and outlet ports and said chamber.

4. A magnetically operable one way fluid check valve having a body, a chamber in said body, inlet and outlet ports communicating with said chamber, a valve disc of permeable material and a leg supported cross member cage for said disc and in said chamber, the combination with said valve of: an annular tubular permanent magnet, said magnet being compressed sintered material with a nonpermeable binding material therethrough and positioned within said chamber; means including clamping between said legs of said cage and one end of said body for retaining said magnet in said position within said chamber; an annular nonpermeable valve seat formed integrally on said magnet from said binding material, said seat having a diameter spaced within said cage legs and less than a diameter of said magnet, said disc being adapted for fluid sealing cooperation with an annular face of said valve seat by attraction thereto and retention thereon by said magnet; an angularly disposed surface on one cross member of said cage whereby to retain said disc in an angular disposition relative to and spaced from said valve seat upon fluid flow through said inlet and outlet ports and said chamber; and angularly disposed edges on said one cross member of said cage to permit lateral displacement of said valve disc when in an open position.

(References on following page)

References Cited in the file of this patent

UNITED STATES PATENTS

| | | | |
|---|---|---|---|
| 1,047,195 | Fries | Dec. 17, | 1912 |
| 1,160,707 | Garber | Nov. 16, | 1915 |
| 1,328,057 | Ryan | Jan. 13, | 1920 |
| 1,792,509 | Peters | Feb. 17, | 1931 |
| 2,221,983 | Mayer | Nov. 19, | 1940 |
| 2,385,578 | Kaschke | Sept. 25, | 1945 |
| 2,597,952 | Rosenlund | May 27, | 1952 |
| 2,646,071 | Wagner | July 21, | 1953 |
| 2,652,520 | Studders | Sept. 15, | 1953 |
| 2,797,704 | McDermott | July 2, | 1957 |